Figure 1:
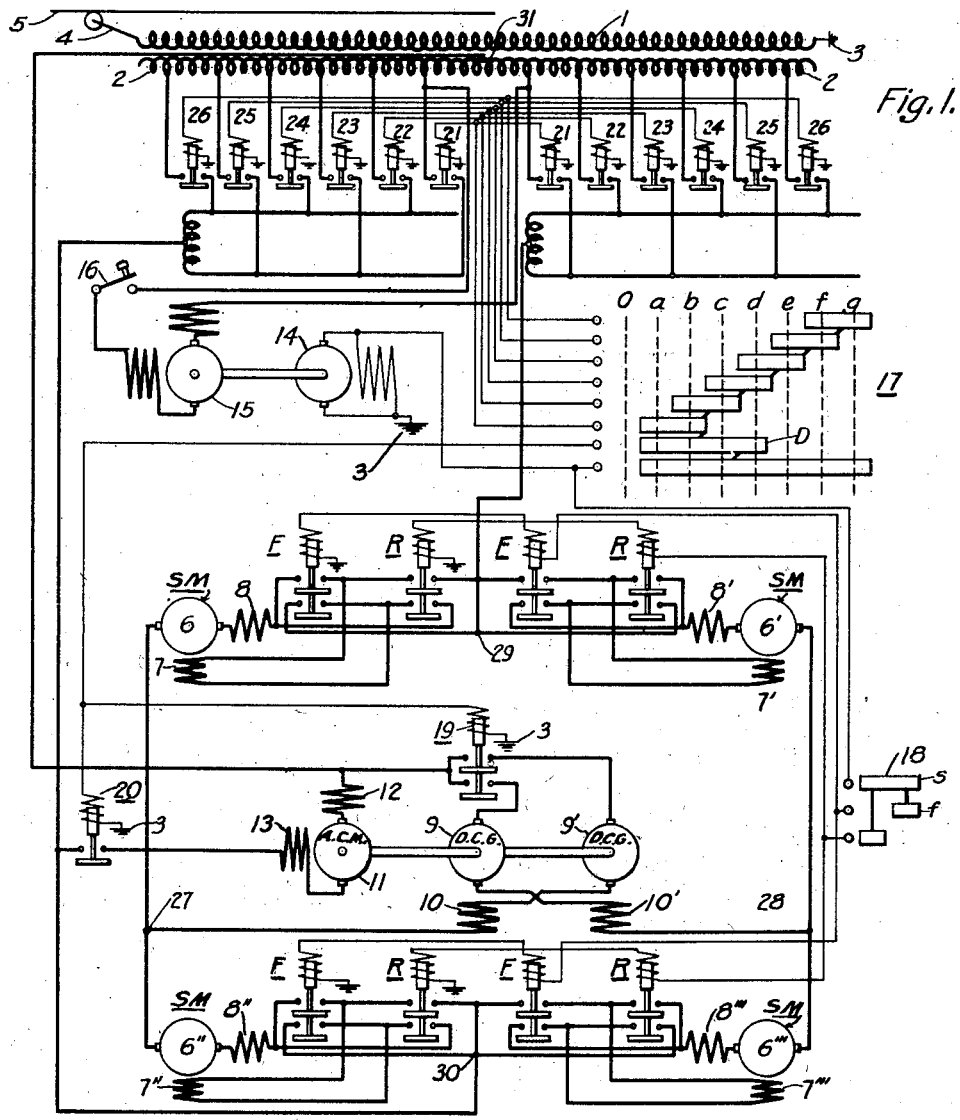

March 14, 1933.  S. G. NOTTAGE  1,901,608

CONTROL SYSTEM

Filed June 16, 1930

INVENTOR
Stanley G. Nottage
BY
ATTORNEY

Patented Mar. 14, 1933

1,901,608

UNITED STATES PATENT OFFICE

STANLEY G. NOTTAGE, OF MURRYSVILLE, PENNSYLVANIA, ASSIGNOR TO WESTING-
HOUSE ELECTRIC & MANUFACTURING COMPANY, A CORPORATION OF PENNSYL-
VANIA

CONTROL SYSTEM

Application filed June 16, 1930. Serial No. 461,273.

My invention relates to methods of, and means for, operating electric motors and is particularly applicable to motors used in railway service, such as motors of the series type.

In electric-railway service, it is of special importance that the motors utilized have capacity to develop a large starting torque to accelerate the car or train, as the case may be, with the desired dispatch, and, to this end, series commutator motors are usually employed. The series motors, under such conditions, commutate very badly, i. e., excessive sparking takes place at the brushes. This sparking is the result of an electromotive force produced in the armature windings short-circuited by the brushes by transformer action and which is not compensated for during starting. To reduce such objectionable features to a minimum, the motors were formerly operated at low flux densities, which, for a given car, of necessity required bulky and expensive motors.

It is an object of my invention to prevent sparking by the provision of new means for operating such series commutator motors, whereby the motors produce a large starting torque with good commutation and without necessitating the bulky and expensive motor design.

In practicing my invention, I employ a motor which may be operated either by direct current or by alternating current, as, for example, a series motor of the commutator type, and operate it by initially and simultaneously supplying low-voltage direct current and low-voltage alternating current to the same, thereafter successively and simultaneously increasing the direct-current voltage and alternating-current voltage supplied to the motor to accelerate it and finally, during final stages of acceleration, supplying successively higher alternating-current voltages only till full-speed operation is attained, at which time, alternating current of constant value is supplied to the motor. Under such operating conditions, a series commutator motor starts with a large starting torque and commutates well, and the heavy and expensive motor design is not necessary.

With the procedure just discussed, it is, of course, understood that the alternating-current and direct-current voltages initially supplied to the motor need not be of the same value. In the preferred operation, the direct-current voltage, initially and simultaneously applied with the alternating current, is higher than the voltage of the alternating current, but the reverse may also be true.

A novel feature of my invention also resides in the circuit connections, whenever a sufficient number of motors are employed. The motors are connected in parallel-circuit relation to both, the source of alternating-current supply and the source of direct-current supply, and the arrangement is such that equipotential points of said circuits with reference to the direct-current source are connected to the alternating-current supply, and that equipotential points of the said circuits with reference to the alternating-current source are connected to the direct-current supply.

Figure 2:
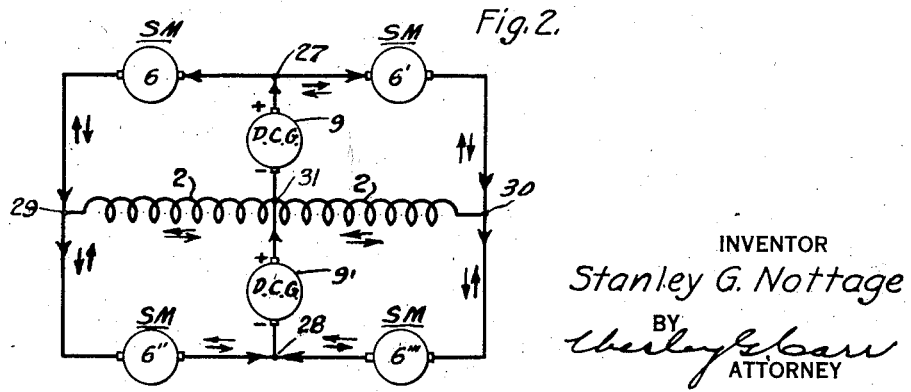

Other features of novelty which characterize my invention are set forth with particularity in the appended claims. The invention itself, however, both as to its organization and its method of operation, together with additional objects and advantages thereof, will best be understood from the following description of a specific embodiment, when read in connection with the accompanying drawing, in which:

Figure 1 is a diagram of connections illustrating my invention in relation to a specific application, whereas Fig. 2 shows diagrammatically my invention in its simplest aspect.

In Fig. 1 of the drawing, I have shown motors, SM, of the series commutator type usually employed in railway service. The motors are more specifically designated by reference characters 6, 6', 6" and 6"', and have exciting series field windings 7, 7', 7" and 7"', and commutating or compensating series field windings 8, 8', 8" and 8"', respectively. A source of alternating current, illustrated as a transformer, has its primary winding 1 connected between a trolley wire 5 and the ground 3 by means of the pantograph 4 of the car or train. The secondary winding 2 is connected to the motors by means of a controller 17, as will be explained more in detail hereinafter. A source of direct current, shown as series generators 9 and 9', (D. C. G.), is also connected to the motors by means of the controller 17. The generators 9 and 9' are shown as driven by an alternating-current motor 11, (A. C. M.) also connected to the main source of alternating current by means of the controller 17.

By reference to the drawing and, more particularly, Fig. 2 thereof, it will be noted that motors 6 and 6', connected in series, are connected in parallel circuit with motors 6'' and 6''', connected in series, when the circuit connections are considered with relation to the transformer terminals 29 and 30, whereas motors 6 and 6'', connected in series, are connected in parallel circuit with motors 6' and 6''', connected in series, when considered in relation to the terminals 27 and 28, terminals of series direct-current generators 9 and 9'. It is thus apparent, in the absence of unbalance, that points 29 and 30 are of equal potential with reference to the generators 9 and 9' and that points 27 and 28 are of equal potential with reference to the alternating-current supply.

During starting, the voltage delivered by the secondary 2 to the motors 6, 6', 6'' and 6''' is caused to change from a low value to a high value and, since the voltage impressed on motor 11 and, consequenty, its speed is proportional to this change, the voltage of the direct-current generators 9 and 9' increases in proportion to the voltage change of the transformer. The result is that the motors 6, 6', 6'' and 6''' accelerate quickly and uniformly and there is no sparking at the brushes.

The application of alternating current to the motors, especially as the voltage increases, tends to saturate the field of the motors, but this will not decrease the torque developed by the motors, but, if anything, will increase the torque, since the motors will draw more current from the generators 9 and 9' than they would draw at the same speed if they were fed by direct current alone, due to the fact that the fields are being saturated by the alternating current and, consequently, it requires more direct current to produce the field strength that corresponds to the impressed direct-current voltage.

For the greater part of the range of acceleration, the alternating current is small relative to the direct-current, and it has been found that alternating current of a given voltage, when applied with direct-current produces much less sparking than if the same voltage of alternating current were applied alone. The reason for this is that the fields are saturated by direct current and, therefore, the electromotive force produced in the armatures by the alternating-current excitation is lower than it would be with the same number of amperes of alternating current.

As the alternating-current voltage and the direct-current voltage are increased, the the motors continue to accelerate, and, at some fairly high speed, operate as pure alternating-current motors, the counter-electromotive force, due to the direct-current excitation, preventing any substantial flow of direct current. When the counter-electromotive force thus prevents direct-current excitation, the direct-current generators 9 and 9' are disconnected from the motors by the operation of the controller 17.

It will be noted that the generators 9 and 9' are connected, at 31, to the secondary 2 of the transformer. This has the advantage of establishing a somewhat independent local circuit for each motor with the alternating-current supply and the direct-current supply connected in series.

A complete understanding of my invention may, be best gained from a description of the operation of the means disclosed in Fig. 1. Assuming that the trolley wire 5 is supplied with alternating current of the desired voltage, and that the pantograph 4 has been placed as shown and that the primary 1 of the transformer is grounded at 3. Depression of switch 16 impresses a comparatively low voltage of alternating current on series commutator motor 15. It will, of course, be understood that motor 15 has proper protecting equipment and, in this instance is shown connected in a simple circuit for purposes of clarity only. Motor 15 drives the shunt-wound direct-current generator 14 which supplies direct current of constant voltage to the control circuits.

If the reversing controller 18 be now so moved that contact segments "s" and "f" connect the upper two contact fingers of this controller, a circuit is established from the generator 14, through contact segments "s" and "f", the four actuating coils of forward relays or contactors F and the ground, to the generator 14. The reversing controller 18 is then left in this position, and the attendant proceeds to manipulate controller 17.

Movement of the controller 17 to the position "a" causes simultaneous energization of the coils of relays 19, 20, and accelerating relays 21 and 21. Since the forward contactors F are closed, operation of the accelerating relays 21 impresses a low alternating-current voltage on motors 6, 6', 6'' and 6'''. Operation of relay 20 impresses a low alternating-current voltage on series commutator motor 11. The voltage impressed on motor 11 is always one-half that impressed on the motors 6, 6', 6'', and 6''' because one terminal of the motor is connected at 31, the midpoint of the secondary of the transformer, while the connection of the other terminal is governed by but one set of the accelerating relays 21 to 26 inclusive.

The voltage impressed on motor 11 determines the speed of motor 11 and, in consequence, determines the voltage of generators 9 and 9′, but it does not follow that the combined voltage of the generators 9 and 9′ will be proportional to the alternating-current voltage appearing at junctions 29 and 30. In the preferred practice, the combined voltage of the generators 9 and 9′ is adjusted to be higher than the alternating-current voltage across junctions 29 and 30. To this end, the series field windings 10 and 10′ are provided with adjusting rheostats. These rheostats and similar control equipment associated with each of the machines illustrated in Fig. 1 have not been shown because such apparatus forms no part of my invention and if shown, would be apt to conceal the real invention rather than aid in its disclosure.

At the same instant that relays 20 and 21 function, relay 19 operates to connect the series direct-current generators 9 and 9′ to the main driving motors 6 to 6‴, inclusive.

After the main driving motors have accelerated to the speed possible with the voltage impressed, the controller 17 is moved to position b, thus causing operation of accelerating relays 22. The alternating-current voltage impressed on the main driving motors is increased a definite amount, and the voltage impressed on motor 11 is increased one-half that definite amount. The increased speed of motor 11 causes a higher direct-current voltage to be supplied by generators 9 and 9′. Successive movements of controller 17 thus causes higher and higher alternating and direct-current voltages to be impressed on the main driving motors.

As the motors attain a considerable speed, the counter-electromotive force of the motors prevents the flow of direct-current. At this stage of acceleration, the direct-current excitation is removed from the main driving motors. In actual practice, many more accelerating relays may be utilized, than are shown in Fig. 1, and, also, the controller segment D may extend over a greater or a smaller number of the controller positions. In any case, when the counter-electromotive force increases, as above explained, the controller segment D is moved to position "e", in this particular showing it disengages the corresponding contact finger, thus causing relays 19 and 20 to be deenergized. Deenergization of relays 19 and 20, causes interruption of the direct-current supply to the main driving motors 6, 6′, 6″, and 6‴.

After the disconnection of the direct-current generators from the main driving motors, the main driving motors are further accelerated by successive movements of the controller 17. When the last pair of accelerating relays have operated, full alternating-current voltage is supplied to the motors, and the motors carry the load on alternating current alone.

Attention is also called to the fact that the controller segments for the accelerating relays extend only over two controller positions. The beneficial effect of this feature is that preceding accelerating relays are deenergized upon energization of following accelerating relays.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In combination, a series commutator motor of such design to normally operate by alternating current, a source of alternating current, a source of direct current, a manually operable controller, means responsive to operations of the controller for initially and simultaneously automatically connecting low voltages of both said sources of current to the motor, means responsive to operations of the controller for successively and simultaneously automatically increasing the voltages impressed on the motor, and means for automatically disconnecting the source of direct current from the motor when the voltage of the alternating current impressed on the motor has increased to a predetermined value.

2. In combination, a series commutator motor of such design to normally operate by alternating current, a source of alternating current, a source of direct current, a manually operable controller, means responsive to the controller for initially and automatically connecting a low voltage of alternating current to the motor, means responsive to the controller for initially and automatically connecting a relatively higher voltage of direct current to the motor, means for successively automatically increasing the alternating-current voltage impressed on the motor, means for substantially proportionally increasing the direct-current voltage impressed on the motor, and means for disconnecting the source of direct current from the motor when the alternating-current voltage impressed on the motor has increased to a predetermined value.

3. The method of operating a series commutator electric motor which consists in initially and simultaneously supplying the motor with direct current and alternating current to start the motor and thereafter increasing the voltages of these currents to accelerate the motor.

4. The method of operating a series commutator electric motor which consists in initially supplying the motor with alternating current of a low voltage, also initially supplying the motor with direct current of somewhat higher voltage, whereby the motor is caused to start, and thereafter successively and simultaneously increasing the voltages impressed on the motor to accelerate the motor.

5. The method of operating a series commutator electric motor which consists in initially and simultaneously supplying the motor with direct and alternating current to start the motor, then successively and simultaneously increasing the voltages impressed on the motor to accelerate the motor, and thereafter ceasing the application of direct current to the motor when the alternating-current voltage has been increased to a predetermined value.

6. The method of operating a series commutator electric motor which consists in initially supplying the motor with alternating current of relatively low voltage, also initially supplying the motor with direct current of somewhat higher voltage to start the motor, simultaneously increasing both the voltages impressed on the motor at the same rate to accelerate the motor, and thereafter ceasing the application of the direct-current voltage when the alternating-current voltage has been increased to a predetermined value, and further increasing the alternating-current voltage to further accelerate the motor, and finally applying normal full load alternating-current voltage to the motor to cause constant full-speed operation.

7. In a control system for controlling the operation of electrical equipment, a series commutator motor designed to operate when energized by direct-current and to operate normally when energized by alternating-current, a master controller, a source of alternating-current, a source of direct-current, means responsive to the controller for automatically connecting the source of alternating-current to the motor, means responsive to the controller for automatically connecting the source of direct-current to the motor at the same instant the source of alternating-current is connected to the motor, whereby both said sources initiate the operation of the motor and means for automatically maintaining the alternating-current voltage, during the initial stages of motor operation, low relative to the direct-current voltage.

8. In a control system for controlling the operation of electrical equipment, a series commutator motor designed to operate normally when energized by alternating-current and to operate when energized by direct-current, a manually operable master controller, a source of alternating-current, a source of direct-current, means responsive to the controller for automatically and simultaneously applying alternating-current and direct-current to the motor to start the same, means for automatically maintaining said alternating-current voltage, at the moment of starting, low relative to the direct-current voltage, and means for automatically and simultaneously and substantially proportionally increasing the voltages impressed on the motor.

9. In combination, a network of circuits, a plurality of series commutator motors interconnected with said network, a source of alternating current, a source of direct current, a manually operable controller, means for simultaneously and automatically connecting said sources to the network, said means being disposed to automatically connect the source of direct current to equipotential points in the network with reference to the source of alternating current and to equipotential points in the network with reference to the source of direct current, and means responsive to the operations of the manually operable controller for simultaneously and automatically varying the voltages impressed on said network.

In testimony whereof, I have hereunto subscribed my name this 10th day of June 1930.

STANLEY G. NOTTAGE.